(12) United States Patent  
Baker (10) Patent No.: US 8,869,509 B2  
(45) Date of Patent: Oct. 28, 2014

(54) ACCESSORY FLOW RECOVERY SYSTEM AND METHOD FOR THERMAL EFFICIENT PUMP AND CONTROL SYSTEM

(75) Inventor: Carthel C. Baker, Oregon, IL (US)

(73) Assignee: Woodward, Inc., Fort Collins, CO (US)

(*) Notice: Subject to any disclaimer, the term of this patent is extended or adjusted under 35 U.S.C. 154(b) by 775 days.

(21) Appl. No.: 13/157,148

(22) Filed: Jun. 9, 2011

(65) Prior Publication Data

US 2012/0315152 A1    Dec. 13, 2012

(51) Int. Cl.
*F02K 3/00* (2006.01)
*F04B 49/22* (2006.01)
*F02C 7/22* (2006.01)
*F02C 9/26* (2006.01)

(52) U.S. Cl.
CPC . *F04B 49/22* (2013.01); *F02C 7/22* (2013.01); *F02C 9/263* (2013.01); *Y02T 50/671* (2013.01)
USPC .................. 60/243; 60/424; 60/468

(58) Field of Classification Search
CPC ............ F04B 49/22; F02C 7/22; F02C 9/263; Y02T 50/671
USPC ............... 60/424, 468, 734, 39.281, 243, 802
See application file for complete search history.

(56) References Cited

U.S. PATENT DOCUMENTS 6,651,441 B2    11/2003 Reuter et al.
8,166,765 B2 *   5/2012 Baker et al. ............... 60/772

* cited by examiner

*Primary Examiner* — Ned Landrum
*Assistant Examiner* — Logan Kraft
(74) *Attorney, Agent, or Firm* — Reinhart Boerner Van Deuren P.C.

(57) ABSTRACT

An accessory flow recovery system includes an inlet that receives a first fluid flow, and a pump with a pump inlet and outlet. The pump inlet receives the first fluid flow from the inlet and discharges a second fluid flow from the outlet. The accessory flow recovery system has an actuation unit for supplying a third fluid flow to accessory components, a metering system to regulate the flow rate of the second fluid flow based on a flow demand, and an inlet pressurizing valve coupled between the outlet and the metering system. The inlet pressurizing valve regulates the second fluid flow between the pump and the metering unit. The accessory flow recovery system further includes a return switch valve to direct the third fluid flow to the metering system when the recovery system is operating in one mode, and to the inlet when the system is operating in another mode.

24 Claims, 4 Drawing Sheets

ACCESSORY FLOW RECOVERY SYSTEM AND METHOD FOR THERMAL EFFICIENT PUMP AND CONTROL SYSTEM

FIELD OF THE INVENTION

This invention generally relates to pumps and pump control systems, and, more particularly to fuel pumps and control systems therefor, such as those used on aircraft, for example.

BACKGROUND OF THE INVENTION

In a typical aircraft fuel system consisting of a positive-displacement pump and bypassing fuel metering unit, a portion of the pump flow is supplied to the combustor to be burned by the engine while another portion of the flow is supplied as accessory flow. For the purposes of this application, accessory flow includes actuation flows, flows used for cooling, servos, and leakage. Typically, the accessory return flow and any excess pump flow are returned to the low pressure inlet of the pump. The positive-displacement aircraft pump is typically sized by either the pump fuel flow required for a relight condition, or for the maximum pump fuel flow required at takeoff condition. The total pump flow required at these conditions includes engine burn flow plus the accessory flows.

The main fuel pumps for turbine-engine aircraft are typically high-pressure, positive-displacement pumps. Generally, the pump flow rates in these pumps is proportional to engine speed. At many engine operating conditions, the engine flow demand is significantly less than the high pressure flow supplied by the main pump. The excess high-pressure pump fuel flow is typically bypassed back to the low pressure inlet of the pump. However, the energy required to raise the pressure of this excess fuel flow, and to return the excess flow back to the low pressure inlet, is effectively wasted. This energy is realized as heat input to the fuel, and results in undesirable higher fuel temperatures under certain conditions.

It would therefore be desirable to have a fuel distribution system and a control system therefor capable of reducing this excess fuel flow, and the wasted energy associated with the operation of these systems. Embodiments of the invention provide such a fuel distribution and control system. These and other advantages of the invention, as well as additional inventive features, will be apparent from the description of the invention provided herein.

BRIEF SUMMARY OF THE INVENTION

In one aspect, embodiments of the invention provide an accessory flow recovery system that includes a system inlet configured to receive a first fluid flow, and a first pump with a pump inlet and a pump outlet. The first pump inlet is configured to receive the first fluid flow from the system inlet and to discharge a second fluid flow from the pump outlet. The accessory flow recovery system also includes an actuation unit for supplying a third fluid flow to operate accessory components, a fluid metering system configured to regulate the flow rate of the second fluid flow based on a flow demand, and an inlet pressurizing valve coupled between the first pump outlet and the fluid metering system. The inlet pressurizing valve is configured to regulate the second fluid flow between the first pump and the fluid metering unit. The accessory flow recovery system further includes a return switch valve configured to direct the third fluid flow to the fluid metering system when the accessory flow recovery system is operating in a first mode, and to the system inlet when the accessory flow recovery system is operating in a second mode.

In another aspect, embodiments of the invention provide a method of fluid distribution that includes receiving a first fluid flow into a first pump configured to discharge a second fluid flow at a higher pressure than the first fluid flow, and providing a metering unit to meter the second fluid flow based on a flow demand. In a particular embodiment, the method also includes providing an accessory flow having hydraulic force sufficient to operate accessory components. The method further includes diverting the accessory flow to the metering unit when the flow demand exceeds the first pump capacity, and diverting the accessory flow to an inlet of the first pump when the flow demand is less than first pump capacity.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In the following description, embodiments of the invention are disclosed with respect to their application in an aircraft fuel distribution system. However, one having ordinary skill in the art will recognize that embodiments of the invention described herein can be applied to the distribution of a variety of fluids, including but not limited to fuels, and in various environments, including but not limited to aircraft, in any situation where access flow recovery, as described herein, may increase the efficiency of the system. Accordingly, embodiments of the invention may include pump and control systems for the distribution of any type of fluid in any environment where embodiments of the access flow recovery systems and methods disclosed herein could result in higher operating efficiencies and/or decreased costs of operation.

Embodiments of the present invention include systems for recovering all or a portion of the accessory flow in a high-pressure pumping system, and returning the recovered flow back to the metering system where it is available to be supplied to the engine as burn flow. A pressure differential between the high-pressure pump discharge and the low-pressure return provides the necessary hydraulic force to operate the servo and actuation functions. Recovering the accessory flow and supplying the same flow as burn flow reduces the total flow required to be supplied by the pump and therefore can significantly reduce the displacement (size) of the pump. The reduced pump displacement leads to less excess pump flow being raised to high pressure and therefore minimizes excess energy usage and heat input to the fuel. In addition, reducing the pump displacement typically allows the pump size and weight to be reduced.

Figure 1:
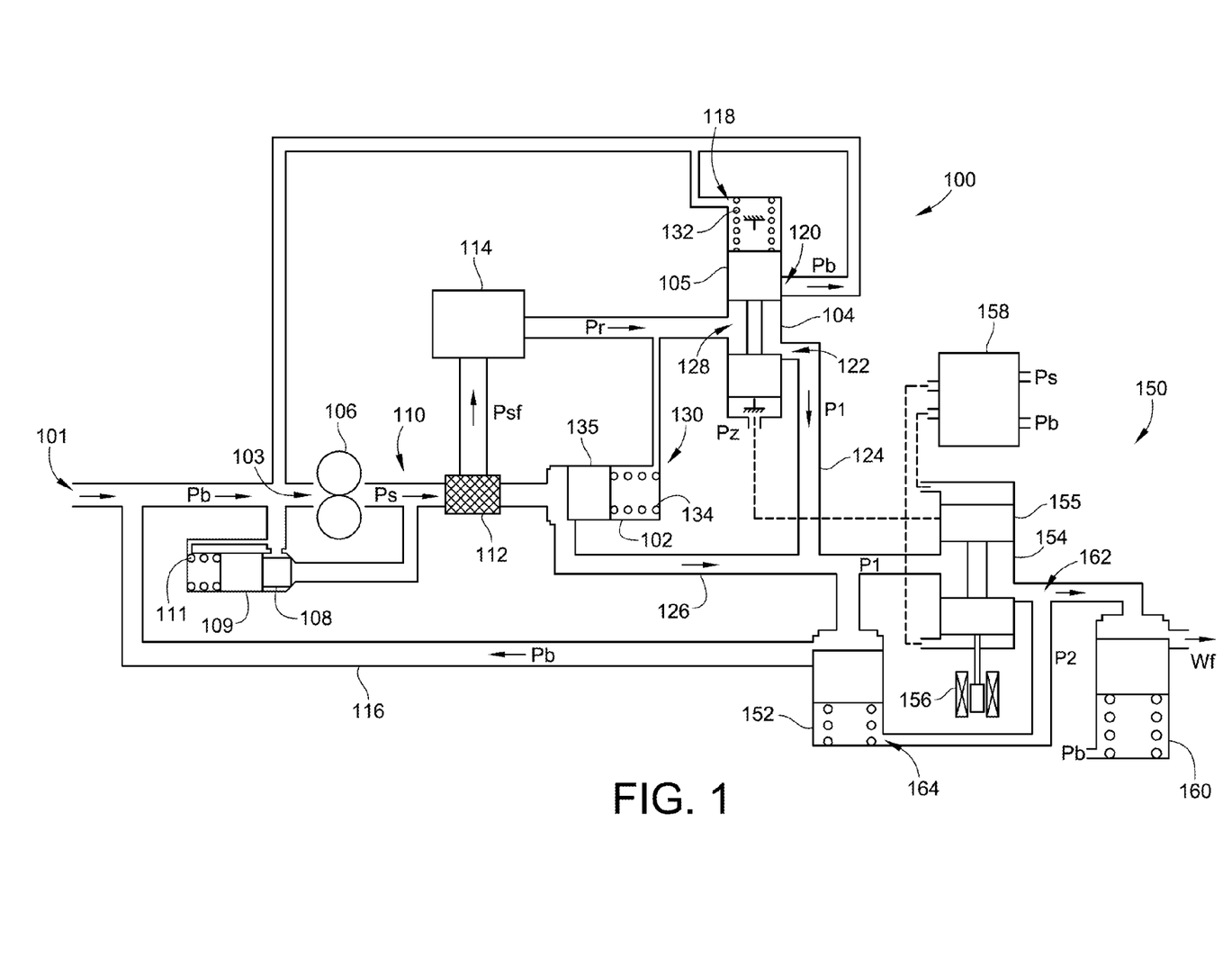
FIG. 1 is a schematic diagram of an accessory flow recovery system configured for use with a fluid metering unit, in accordance with an embodiment of the invention.

FIG. 1 is a schematic diagram of an accessory flow recovery system 100, according to an embodiment of the invention. The accessory flow recovery system 100 is configured to be used with a typical fluid metering system, or fluid metering unit 150. In the embodiment of FIG. 1, the accessory flow recovery system 100 includes a system inlet 101, an inlet pressurizing valve 102, a return switch valve 104, and a pump 106, and a high-pressure relief valve 108. In a particular embodiment, pump 106 is a fixed-positive-displacement pump with a pump inlet 103 that is fed by system inlet 101. However, it is envisioned that, in certain embodiments of the invention, pump 106 could be a variable-displacement pump.

Pump 106 has a discharge outlet 110 in fluid communication with a high-pressure relief valve 108, and also in fluid communication, through a wash screen 112, with the inlet pressurizing valve 102 and to a servo actuation unit 114. In certain embodiments, the high-pressure relief valve 108 includes a valve member 109 that is biased toward the closed position by a biasing element 111 which may be a coiled spring, for example. System inlet 101, in addition to being in fluid communication with the pump inlet 103, is in fluid communication, via return line 116, with the inlet of fuel valve 154 through bypass valve 152, and also in fluid communication with a first port 118 and second port 120 on return switch valve 104. A third port 122 on return switch valve 104 is in fluid communication with flow line 124 which is in fluid communication with an inlet for fuel valve 154, with return line 116 through bypass valve 152, and with flow line 126 which is regulated by inlet pressurizing valve 102. A fourth port 128 on return switch valve 104 is in fluid communication with the servo actuation unit 114, and with a port 130 on the inlet pressurizing valve 102.

In a particular embodiment, the fluid metering unit 150 includes the bypass valve 152, the fluid metering valve 154, which, in a particular embodiment, includes a linear variable displacement transformer (LVDT) 156 to accurately sense the position of valve member 155 for the fuel valve 154. The fluid metering unit 150 also includes an electro-hydraulic servo valve (EHSV) 158, and a pressurizing and shutoff valve 160. The EHSV 158 has two ports that are coupled to two ports of fuel valve 154, and operates to position the valve member 155 based on the engine burn flow demand. Valve 154, which is a fuel valve in particular embodiments, has an outlet 162 in fluid communication with the pressurizing and shutoff valve 160, and with a port 164 on bypass valve 152. The pressurizing and shutoff valve 160 regulates the flow of fluid from the accessory flow recovery system 100. For example, if the accessory flow recovery system 100 were being used in the fuel distribution system of an aircraft, the fuel flow from the pressurizing and shutoff valve 160 would flow to the aircraft engine. In a more particular embodiment, the fluid metering unit 150 is a fuel metering unit, and fluid metering valve 154 is a fuel metering valve. Fuel metering unit 150 and fuel metering valve 154 could be used in the fuel distribution system of an aircraft, for example.

Operation of the inlet pressurizing valve 102 may cause a pressure drop at the inlet of the fluid metering unit 150 and also result in undesirable higher pressures at the discharge outlet 110 of the pump 106. The resulting higher pump differential pressure leads to higher pump horsepower usage and reduces the benefit of recovering the accessory flows. For this reason it may be desirable to only recover accessory flow at the key pump sizing conditions and to return accessory flow to the pump inlet 103 for key thermal operating conditions. The combination of a smaller pump displacement and the lower differential pressure at the key thermal operating conditions leads to lower pump power usage and less heat input to the fuel. This is achieved by operation of the return switch valve 104 which changes the location of the accessory return flow based on operating conditions or flow demand.

The accessory flow recovery system 100 of FIG. 1 shows the system in flow recovery mode. Flow recovery mode is used when the total flow demand (i.e., the engine burn flow demand plus accessory flow demand) exceeds the pump capacity. In some cases, this system 100 will allow the pump 106 to be sized to supply only maximum burn flow plus some margin. Prior to when the total engine burn flow demand plus accessory flows exceeds the pump capacity, the system 100 is switched to flow recovery mode, and the accessory flow is returned to the metering system 150. In this mode, the pump 106 no longer has to supply accessory flow plus the engine burn flow, since the accessory flow is recovered and can be supplied as engine burn flow.

As seen from FIG. 1, high-pressure accessory flow (Psf) is provided from the pump 106 through wash screen 112 to supply the accessory flow demand. The return switch valve 104 is positioned such that the accessory flow return path to the low pressure pump inlet 103 is blocked and the path to the fluid metering system 150 through flow line 124 is open. In a particular embodiment of the invention, a valve member 105 of the return switch valve 104 is positioned, at least partially, based on a hydraulic signal from the fuel valve 154. In a more particular embodiment, a biasing element 132, such as a coil spring for example, urges the valve member 105 into a position where the flow from actuation unit 114 flows to the fluid metering unit 150. However, the positioning of valve member 105 can be achieved in numerous ways.

The accessory return flow passes through the return switch valve 104 to flow line 124 where the flow can be used to supply engine burn flow, or returned back to the low-pressure pump inlet 103 via the bypass valve 152 and return line 116. The accessory return flow pressure (Pr) upstream of the return switch valve 104 is supplied as a reference pressure to the inlet pressurizing valve 102. In accessory-flow-recovery mode, (Pr) is approximately equal to (P1). The inlet pressurizing valve 102 maintains a nearly constant pressure differential from (Psf) to (Pr), that is, from an the inlet of the servo actuation unit 114 to an outlet of the servo actuation unit 114. This differential pressure is maintained at the level required to operate the various accessory components (not shown) driven by the fluid flow from the servo and actuation unit 114. In particular embodiments of the invention, the inlet pressurizing valve 102 includes a biasing element 134, such as a coil spring for example, that urges inlet pressurizing valve member 135 toward the closed position. The inlet pressurizing valve member 135 is driven toward to the open position by fluid flow pressure from the discharge outlet 110 of pump 106.

Figure 2:
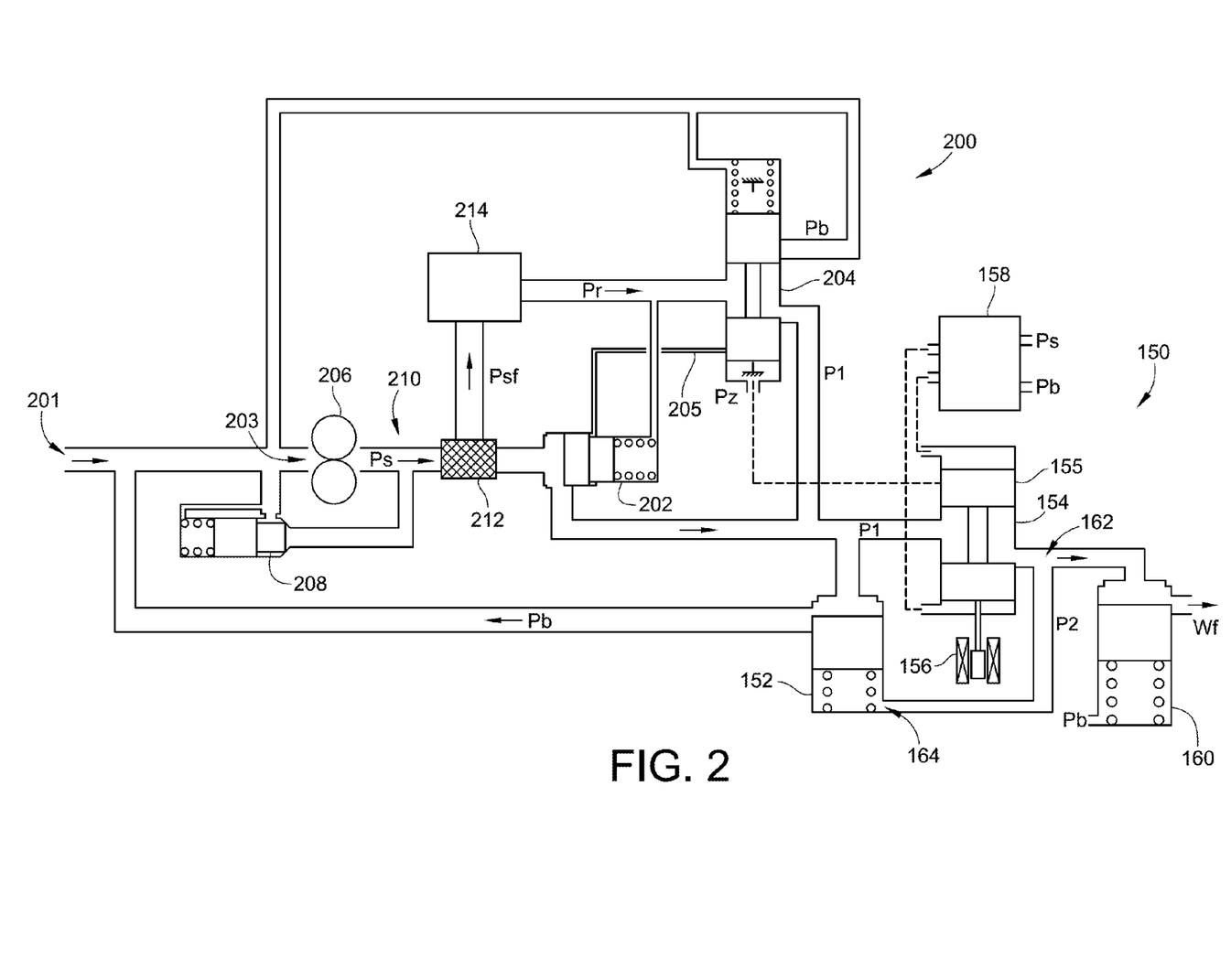
FIG. 2 is a schematic diagram of an accessory flow recovery system with a two-step inlet pressurizing valve, the system configured for use with a fluid metering unit, in accordance with an embodiment of the invention.

As burn flow demand decreases and the pump capacity exceeds the total flow demand, that is, the engine burn flow demand plus accessory flow demand, the system is switched to non-accessory-flow-recovery mode. FIG. 2 is a schematic diagram of an accessory flow recovery system 200 with a two-step inlet pressurizing valve 202, the system configured for use with the fluid metering system or fluid metering unit 150 of FIG. 1, in accordance with an embodiment of the invention. As can be seen from FIG. 2 accessory flow recovery system 200 is similar to the system shown in FIG. 1 having a system inlet 201, a pump 206, a high-pressure relieve valve 208, a return switch valve 204, a wash screen 212, and actuation unit 214. However, in accessory flow recovery system 200, the inlet pressurizing valve 202 provides different differential pressure settings for flow recovery mode verses non flow recovery mode. A pressure switch 205 is coupled between the inlet pressurizing valve 202 and the return switch valve 204. The pressure switch 205, in this embodiment a (Ps) to (Pb) pressure switch, changes the reference pressure applied to a portion of the inlet pressurizing valve 202 based on the position of the return switch valve 204. This pressure switch function allows the differential pressure provided to operate the various accessory components (not shown) to be increased when high-power accessory flow is required. Thus, inlet pressurizing valve 202 is a two-step pressurizing valve, as its reference pressure is determined by (Pr) (as in the accessory flow recovery system 100 of FIG. 1), and by pressure switch 205.

In non-flow-recovery mode, the accessory flow is supplied from the pump 206 through wash screen 212 to actuation unit 214. The return switch valve 204 is positioned such that the return path to the fluid metering unit 150 is blocked and the return path to system inlet 201 is open. The accessory return flow passes through the return switch valve 204 and is returned to a low-pressure pump inlet 203. With the accessory return flow pressure (Pr) supplied as the reference pressure to the inlet pressurizing valve 202, the valve 202 now maintains a nearly constant pressure differential from pump discharge pressure (Ps) to pump inlet pressure (Pb) while the valve is in regulation. This differential pressure continues to be maintained at the level required for the accessory flow to operate the various accessory components (not shown) driven by the fluid flow from the actuation unit 214.

Figure 3:
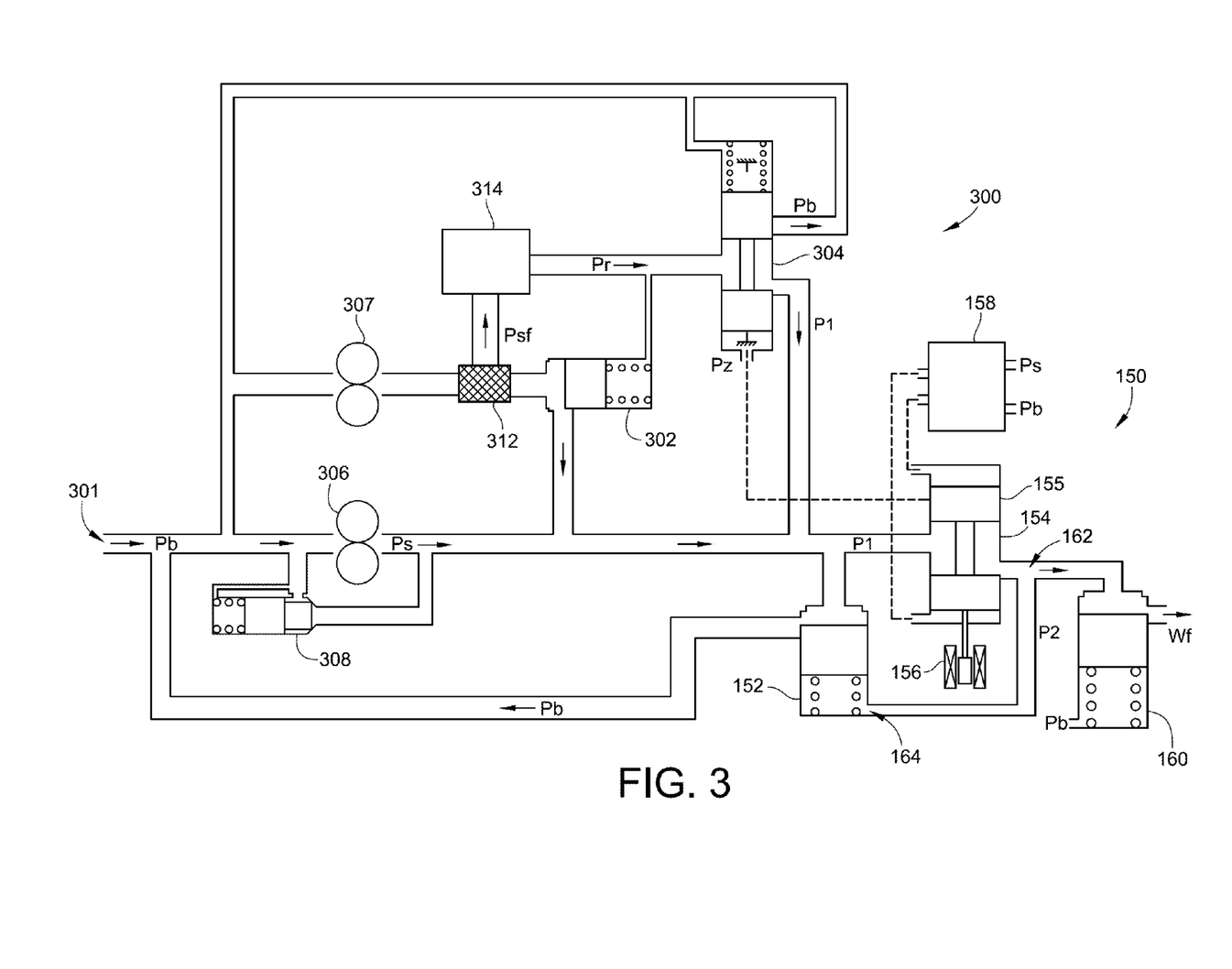
FIG. 3 is a schematic diagram of a dual-pump accessory flow recovery system configured for use with a fluid metering unit, in accordance with an embodiment of the invention.

FIG. 3 is a schematic diagram of a dual-pump accessory flow recovery system 300 configured for use with the fluid metering unit 150, in accordance with an embodiment of the invention. In the embodiment shown, the accessory flow recovery system 300 is similar to the system shown in FIG. 1, except that accessory flow recovery system 300 includes dual pumps (i.e., first pump 306 and second pump 307). In particular embodiments, first and second pumps 306, 307 are fixed-positive displacement pumps. However, in alternate embodiments of the invention, variable-displacement pumps are employed.

Accessory flow recovery system 300 has an inlet 301 that feeds into inlets for a first pump 306 and a second pump 307. A high-pressure relief valve 308 is configured to divert a flow from an outlet of the first pump 306 back to the inlet 301 when the pressure at the outlet of the first pump 306 is above a threshold level. An inlet pressurizing valve 302, return switch valve 304 and actuation unit 314 are arranged, with respect to each other, in the same manner as shown in accessory flow recovery system 100 of FIG. 1. As such, the fluid flow pressure (Pr), upstream of the return switch valve 304, serves as a reference pressure for the inlet pressurizing valve 302. Under certain operation conditions, the dual-pump configuration allows for the further reduction of pump input power. In this case, additional pump input power reduction may be achieved since the portion of the flow supplied by the first pump 306 does not need to be raised to the pressure level required for the accessory flow to operate the various components (not shown) driven by the fluid flow from the actuation unit 314.

With respect to use of the accessory flow recovery system 300 in a fuel distribution system, it can be seen from FIG. 3 that all of the fluid flow from first pump 306 is available to be supplied for engine burn flow. The fluid flow from second pump 307 supplies the accessory flow and the excess pump flow is supplied from the first pump 306 through the inlet pressurizing valve 302 to the fluid metering unit 150. In other respects, embodiments of accessory flow recovery system 300 operate in essentially the same manner as embodiments of accessory flow recovery system 100 of FIG. 1.

Figure 4:
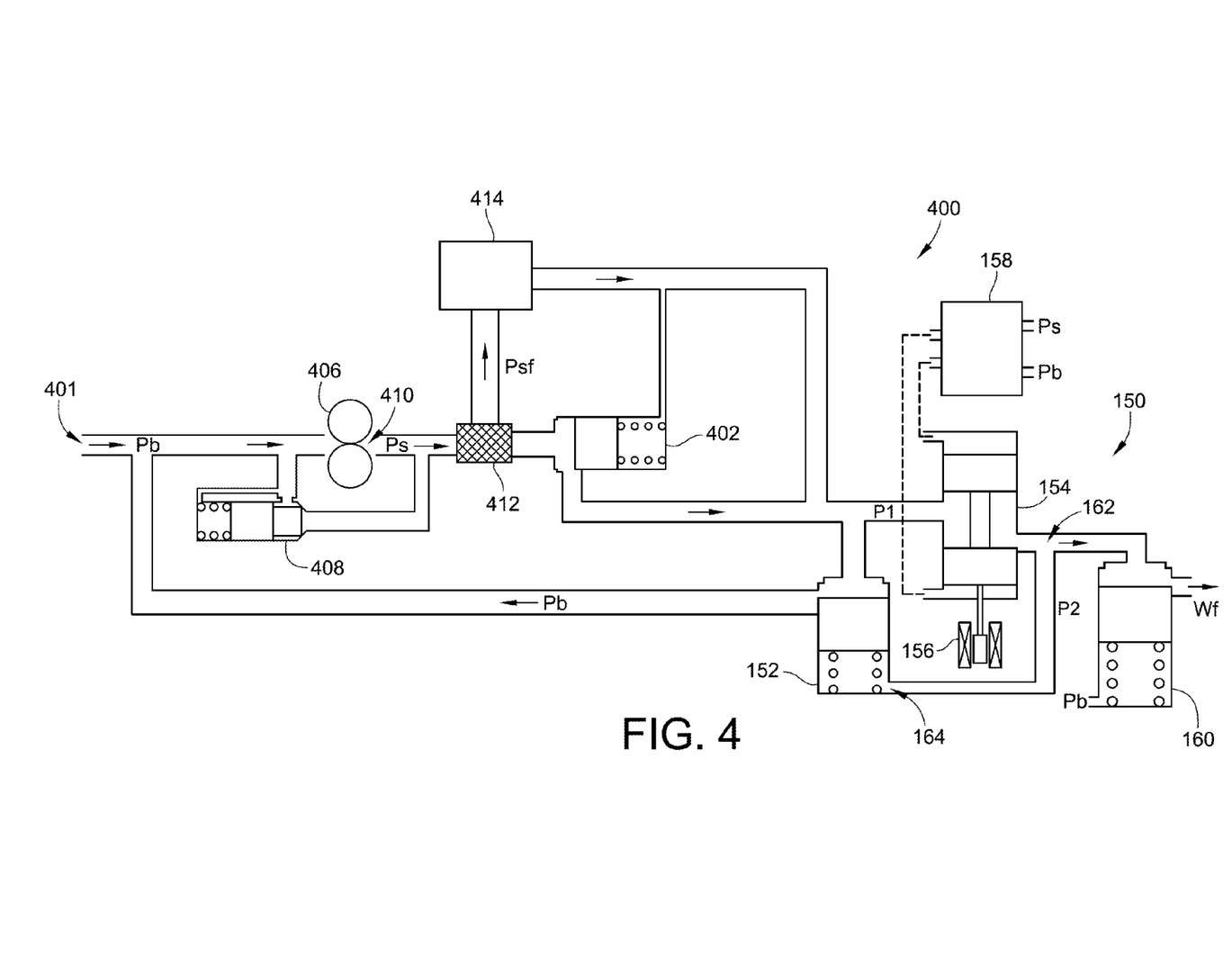
FIG. 4 is a schematic diagram of a non-switching accessory flow recovery system configured for use with a fluid metering unit, in accordance with an embodiment of the invention.

FIG. 4 is a schematic diagram of a non-switching accessory flow recovery system 400 configured for use with a fluid metering unit 150, in accordance with an embodiment of the invention. In the embodiment of FIG. 4, the non-switching accessory flow recovery system 400 has an inlet 401 feeding a pump 406 with a discharge outlet 410 in fluid communication with a high-pressure relief valve 408. The pump discharge outlet 410 is also in fluid communication, via wash screen 412, with inlet pressurizing valve 402 and with actuation unit 414. The configuration of non-switching accessory flow recovery system 400 is similar to that of accessory flow recovery system 100 shown in FIG. 1, except that there is no return switch function and the return switch valve is not included. In operation, non-switching accessory flow recovery system 400 functions in much the same way as the accessory flow recovery system 100 of FIG. 1 in the accessory flow recovery mode, except that, in non-switching accessory flow recovery system 400, the accessory return flow is returned directly to (P1) for all operating conditions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An accessory flow recovery system comprising:
   a system inlet configured to receive a first fluid flow;
   a first pump with a pump inlet and a pump outlet, the first pump inlet configured to receive at least a portion of the first fluid flow from the system inlet and to discharge a second fluid flow from the pump outlet;
   an actuation unit to operate accessory components and for supplying a third fluid flow;
   a fluid metering system configured to regulate the flow rate of the second fluid flow based on a flow demand;
   an inlet pressurizing valve in fluid communication with the first pump outlet and with the fluid metering system, the inlet pressurizing valve positioned between the pump outlet and the fluid metering system, and configured to regulate the second fluid flow between the first pump and the fluid metering system based on a pressure of the third fluid flow; and
   a return switch valve configured to direct the third fluid flow to the fluid metering system when the accessory flow recovery system is operating in a first mode, and to direct the third fluid flow to the system inlet when the accessory flow recovery system is operating in a second mode.

2. The accessory flow recovery system of claim 1, wherein the second fluid flow is at a higher pressure than the first fluid flow.

3. The accessory flow recovery system of claim 1, wherein a fluid flow pressure upstream of the return switch valve is supplied as a reference pressure to the inlet pressurizing valve.

4. The accessory flow recovery system of claim 1, further comprising a second pump, the second pump having a second pump inlet configured to receive a portion of the first fluid flow from the system inlet, wherein the first pump is configured to provide fluid flow to the metering unit and the second pump is configured to provide fluid flow to the actuation unit.

5. The accessory flow recovery system of claim 1, wherein the return switch valve is configured to operate in the first mode when a total flow demand exceeds the capacity of the first pump, and to operate in the second mode when the total flow demand does not exceed the capacity of the first pump.

6. The accessory flow recovery system of claim 1, wherein the fluid metering system includes a metering valve configured to receive at least a portion of the fluid flow discharged from the first pump.

7. The accessory flow recovery system of claim 1, wherein the first pump is a fixed-positive-displacement pump.

8. The accessory flow recovery system of claim 1, wherein the third fluid flow provides hydraulic forces to operate the accessory components.

9. An accessory flow recovery system comprising:
   a system inlet configured to receive a first fluid flow;
   a first pump with a pump inlet and a pump outlet, the first pump inlet configured to receive at least a portion of the first fluid flow from the system inlet and to discharge a second fluid flow from the pump outlet;
   an actuation unit for supplying a third fluid flow to operate accessory components;
   a fluid metering system configured to regulate the flow rate of the second fluid flow based on a flow demand;
   an inlet pressurizing valve in fluid communication with the first pump outlet and with the fluid metering system, the inlet pressurizing valve configured to regulate second fluid flow between the first pump and the fluid metering system; and
   a return switch valve configured to direct the third fluid flow to the fluid metering system when the accessory flow recovery system is operating in a first mode and to direct the third fluid flow to the system inlet when the accessory flow recovery system is operating in a second mode;
   wherein a fluid flow pressure upstream of the return switch valve is supplied reference pressure to the inlet pressurizing valve; and
   wherein the inlet pressurizing valve is configured to maintain a relatively constant pressure differential from an inlet of the actuation unit to an outlet of the actuation unit, and wherein the pressure differential ensures an adequate fluid flow to the actuation unit.

10. The accessory flow recovery system of claim 9, further comprising a pressure switch coupled between the inlet pressurizing valve and the return switch valve, the pressure switch configured to increase the pressure differential thereby increasing the pressure of the third fluid flow to the actuation unit.

11. An accessory flow recovery system comprising:
    a system inlet configured to receive a first fluid flow;
    a first pump with a pump inlet and a pump outlet, the first pump inlet configured to receive at least a portion of the first fluid flow from the system inlet and to discharge a second fluid flow from the pump outlet;
    an actuation unit for supplying a third fluid flow to operate accessory components;
    a fluid metering system configured to regulate the flow rate of the second fluid flow based on a flow demand;
    an inlet pressurizing valve in fluid communication with the first pump outlet and with the fluid metering system, the inlet pressurizing valve configured to regulate the second fluid flow between the first pump and the fluid metering system; and
    a return switch valve configured to direct the third fluid flow to the fluid metering system when the accessory flow recovery system is operating in a first mode, and to direct the third fluid flow to the system inlet when the accessory flow recovery system is operating in a second mode;
    wherein the fluid metering system includes a metering valve configured to receive at least a portion of the fluid flow discharged from the first pump; and
    wherein the return switch valve comprises a valve member, and wherein the position of the valve member is at least partially determined by a hydraulic signal from the metering valve.

12. An accessory flow recovery system comprising:
    a system inlet configured to receive a first fluid flow;
    a first pump with a pump inlet and a pump outlet, the first pump inlet configured to receive at least a portion of the first fluid flow from the system inlet and to discharge a second fluid flow from the pump outlet;
    an actuation unit for supplying a third fluid flow to operate accessory components;
    a fluid metering system configured to regulate the flow rate of the second fluid flow based on a flow demand;
    an inlet pressurizing valve in fluid communication with the first pump outlet and with the fluid metering system, the inlet pressurizing valve configured to regulate the second fluid flow between the first pump and the fluid metering system; and a return switch valve configured to direct the third fluid flow to the fluid metering system when the accessory flow recovery system is operating in a first mode, and to direct the third fluid flow to the system inlet when the accessory flow recovery system is operating in a second mode;

wherein the fluid metering system includes a metering valve configured to receive at least a portion of the fluid flow discharged from the first pump; and wherein the metering valve has an inlet port and an outlet port, the inlet port being in fluid communication with a bypass valve and the outlet port being in fluid communication with a shutoff valve.

13. A method of fluid distribution comprising:
receiving a first fluid flow into a first pump configured to discharge a second fluid flow at a higher pressure than the first fluid flow;
providing a metering unit to meter the second fluid flow based on a flow demand;
providing an accessory flow having hydraulic force sufficient to operate accessory components; and
diverting the accessory flow to the metering unit when the flow demand exceeds the first pump capacity, and diverting the accessory flow to an inlet of the first pump when the flow demand is less than first pump capacity; and
regulating the second fluid flow based on a pressure of the accessory flow.

14. The method of claim 13, wherein providing an accessory flow comprises providing an accessory flow to an actuation unit which directs the accessory flow to the accessory components.

15. The method of claim 14, wherein providing an accessory flow to an actuation unit which directs the accessory flow to the accessory components comprises providing an accessory flow which provides hydraulic forces sufficient to operate at least one of a cooling unit and a servo-motor.

16. The method of claim 13, wherein diverting the accessory flow to the metering unit comprises diverting the accessory flow to the metering unit using a return switch valve having a movable valve member, the position of which, determines whether the accessory flow is diverted to the metering unit or to the inlet of the first pump.

17. The method of claim 16, further comprising regulating the second fluid flow using an inlet pressurizing valve.

18. The method of claim 13, wherein providing an accessory flow comprises providing an accessory flow from a second pump.

19. The method of claim 13, wherein receiving a first fluid flow into a first pump configured to discharge a second fluid flow comprises receiving a first fuel flow into a first pump configured to discharge a second fuel flow; and
wherein providing a metering unit to meter the second fluid flow based on a flow demand comprises providing a fuel metering unit to meter the second fuel flow based on an engine burn demand.

20. The method of claim 13, further comprising configuring the return switch valve to switch freely between: 1) diverting the accessory flow to the metering unit when the flow demand exceeds the first pump capacity; and 2) diverting the accessory flow to an inlet of the first pump when the flow demand is less than first pump capacity; as the total flow demand changes.

21. A method of fluid distribution comprising:
receiving a first fluid flow into a first pump configured to discharge a second fluid flow at a higher pressure than the first fluid flow;
providing a metering unit to meter the second fluid flow based on a flow demand;
providing an accessory flow having hydraulic force sufficient to operate accessory components; and
diverting the accessory flow to the metering unit when the flow demand exceeds the first pump capacity, and diverting the accessory flow to an inlet of the first pump when the flow demand is less than first pump capacity;
wherein providing an accessory flow comprises providing an accessory flow to an actuation unit which directs the accessory flow to the accessory components; and
further comprising maintaining a relatively constant pressure differential from an inlet of the actuation unit to an outlet of the actuation unit.

22. A method of fluid distribution comprising:
receiving a first fluid flow into a first pump configured to discharge a second fluid flow at a higher pressure than the first fluid flow;
providing a metering unit to meter the second fluid flow based on a flow demand;
providing an accessory flow having hydraulic force sufficient to operate accessory components; and
diverting the accessory flow to the metering unit when the flow demand exceeds the first pump capacity, and diverting the accessory flow to an inlet of the first pump when the flow demand is less than first pump capacity;
wherein diverting the accessory flow to the metering unit comprises diverting the accessory flow to the metering unit using a return switch valve having a movable valve member, the position of which, determines whether the accessory flow is diverted to the metering unit or to the inlet of the first pump; and
wherein providing a metering unit comprises providing a metering unit with a metering valve, and wherein the return switch valve comprises a valve member whose position is at least partly determined by a hydraulic signal from the metering valve.

23. A method of fluid distribution comprising:
receiving a first fluid flow into a first pump configured to discharge a second fluid flow at a higher pressure than the first fluid flow;
providing a metering unit to meter the second fluid flow based on a flow demand;
providing an accessory flow having hydraulic force sufficient to operate accessory components; and
diverting the accessory flow to the metering unit when the flow demand exceeds the first pump capacity, and diverting the accessory flow to an inlet of the first pump when the flow demand is less than first pump capacity;
wherein diverting the accessory flow to the metering unit comprises diverting the accessory flow to the metering unit using a return switch valve having a movable valve member, the position of which, determines whether the accessory flow is diverted to the metering unit or to the inlet of the first pump;
further comprising regulating the second fluid flow using an inlet pressurizing valve; and
further comprising supplying a reference pressure to the inlet pressurizing valve from the return switch valve.

24. The method of claim 23, further comprising coupling a pressure switch between the inlet pressurizing valve and the return switch valve, the pressure switch configured to increase a pressure differential from an actuation unit inlet to an actuation unit outlet.

\* \* \* \* \*